Sept. 21, 1965
E. MAJOR
3,207,063
JUICE SQUEEZER
Filed April 14, 1964
5 Sheets-Sheet 1
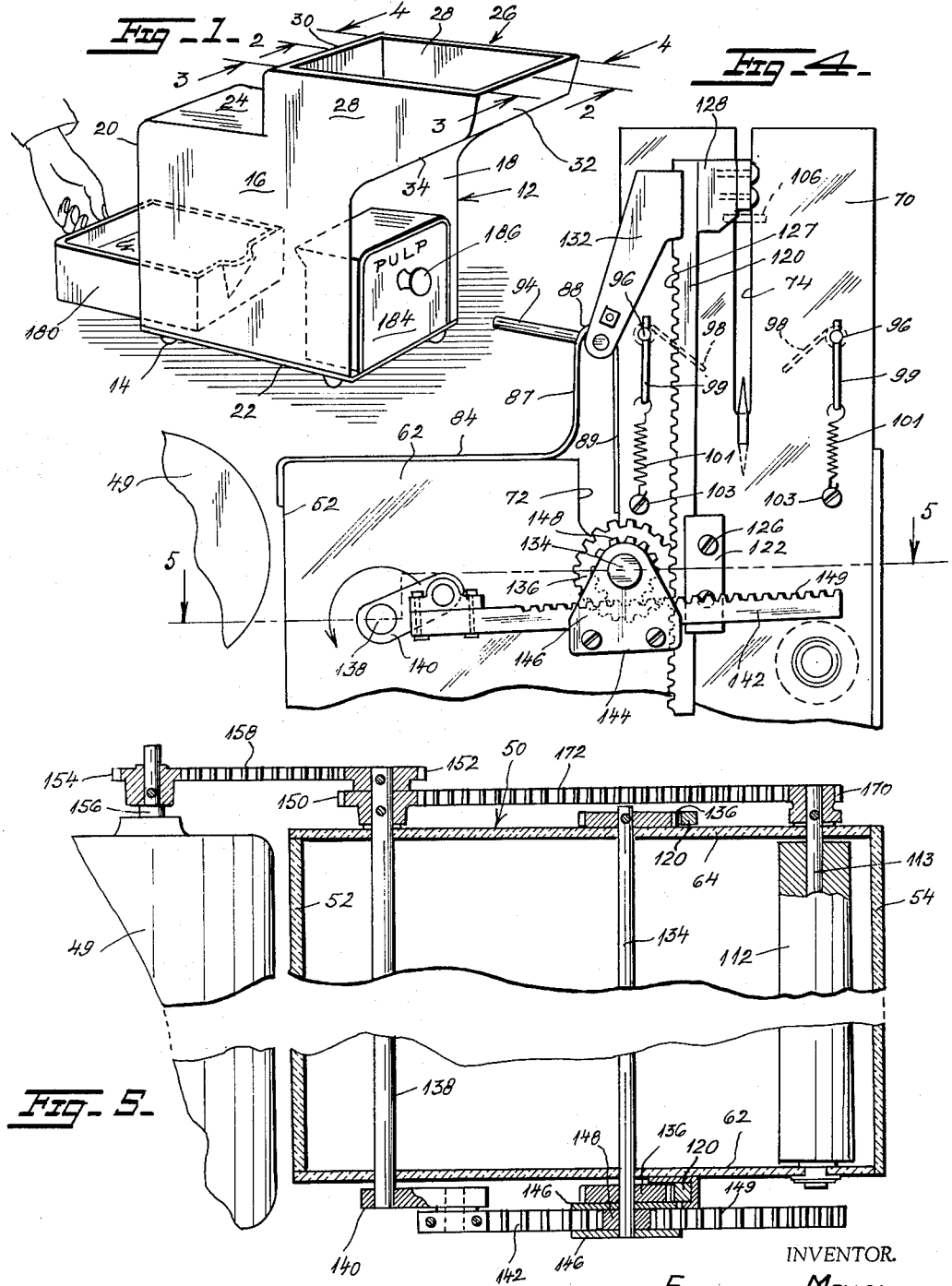
INVENTOR.
Emery Major
BY Polachek & Saulsbury
ATTORNEYS.

Sept. 21, 1965     E. MAJOR     3,207,063
JUICE SQUEEZER
Filed April 14, 1964     5 Sheets-Sheet 2
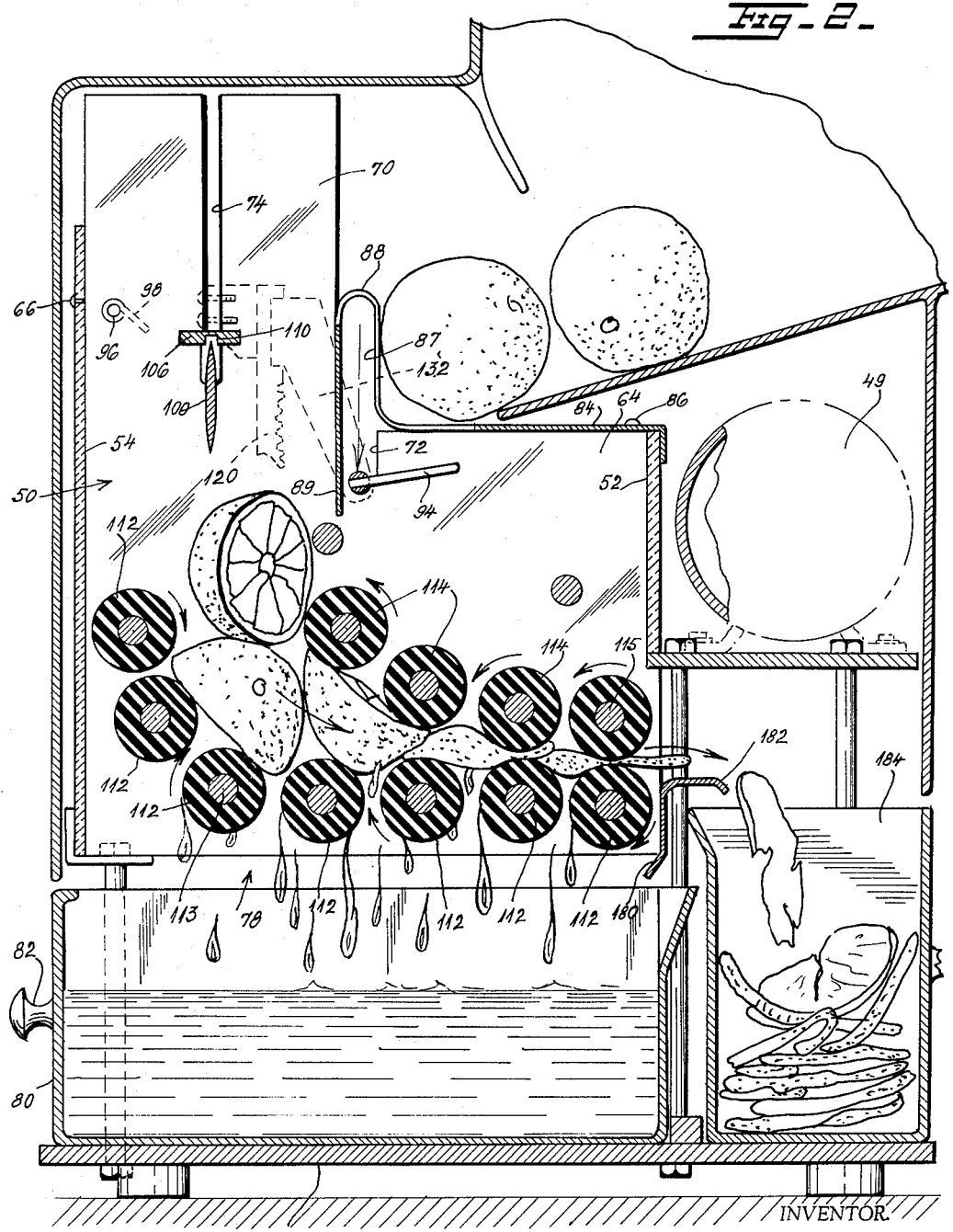
Fig-2-
INVENTOR.
Emery Major
BY Placheck & Saulsbury
ATTORNEYS.

Sept. 21, 1965                    E. MAJOR                    3,207,063
                                JUICE SQUEEZER
Filed April 14, 1964                                      5 Sheets-Sheet 3
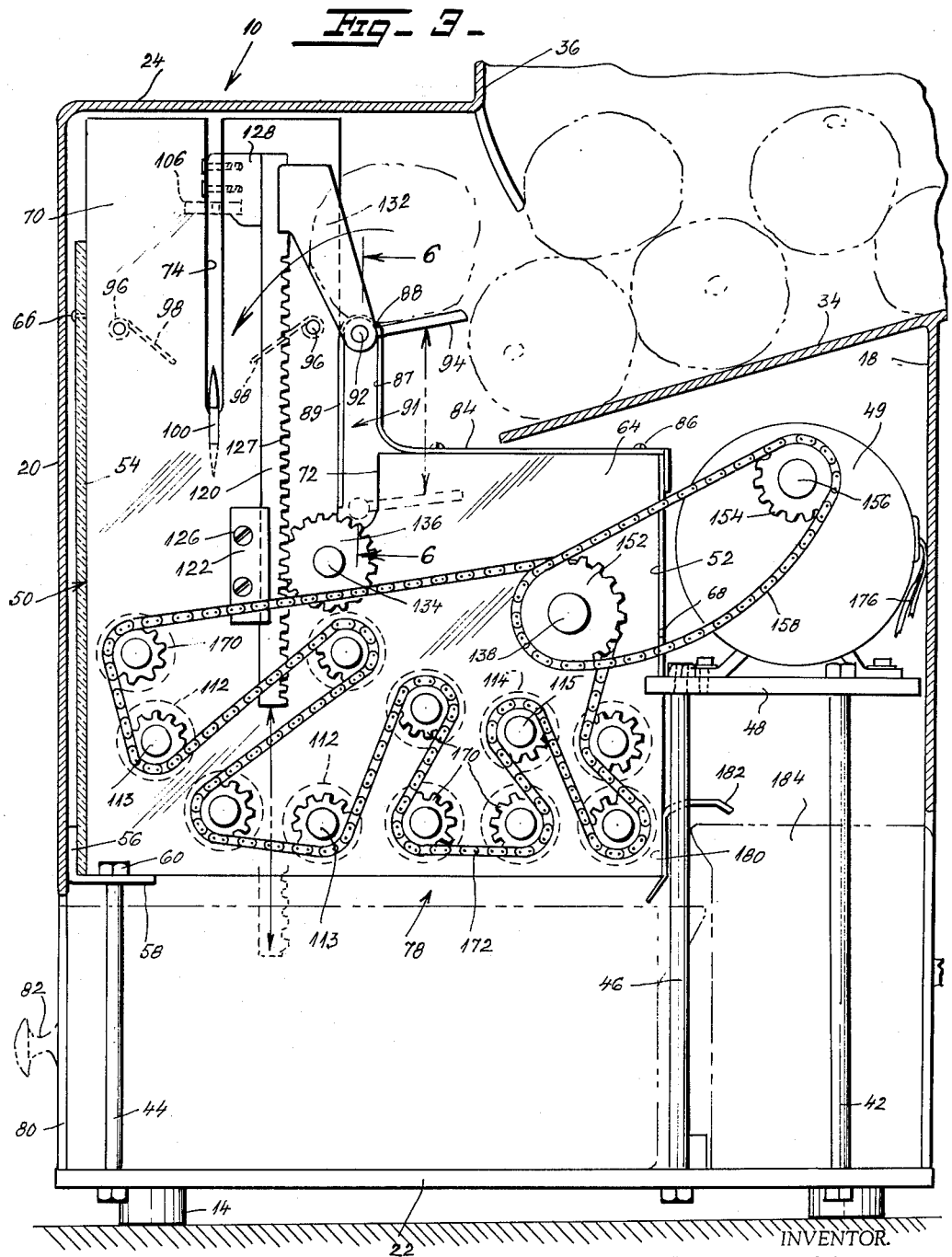
INVENTOR.
Emery Major
BY Polachek & Saulsbury
ATTORNEYS.

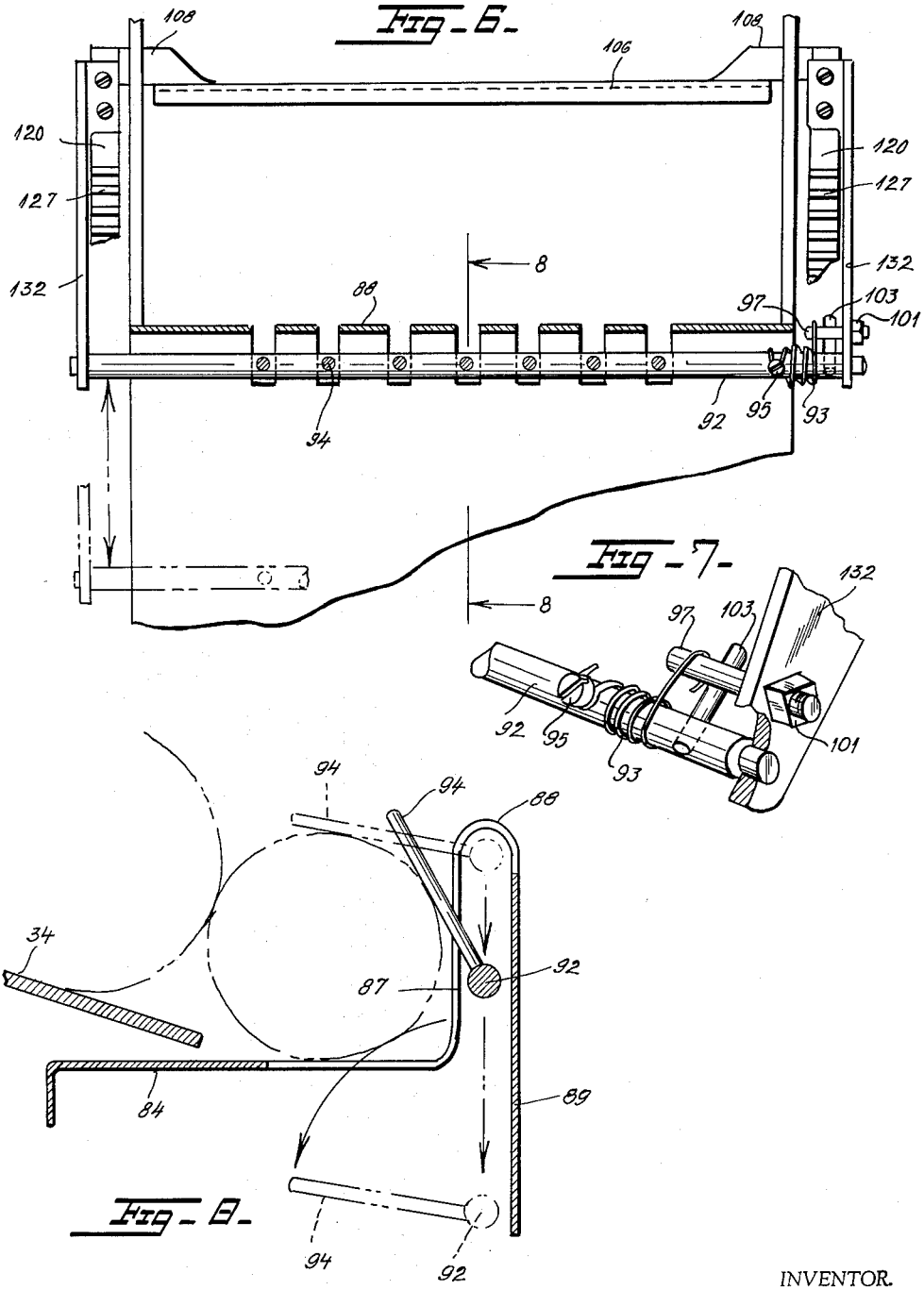

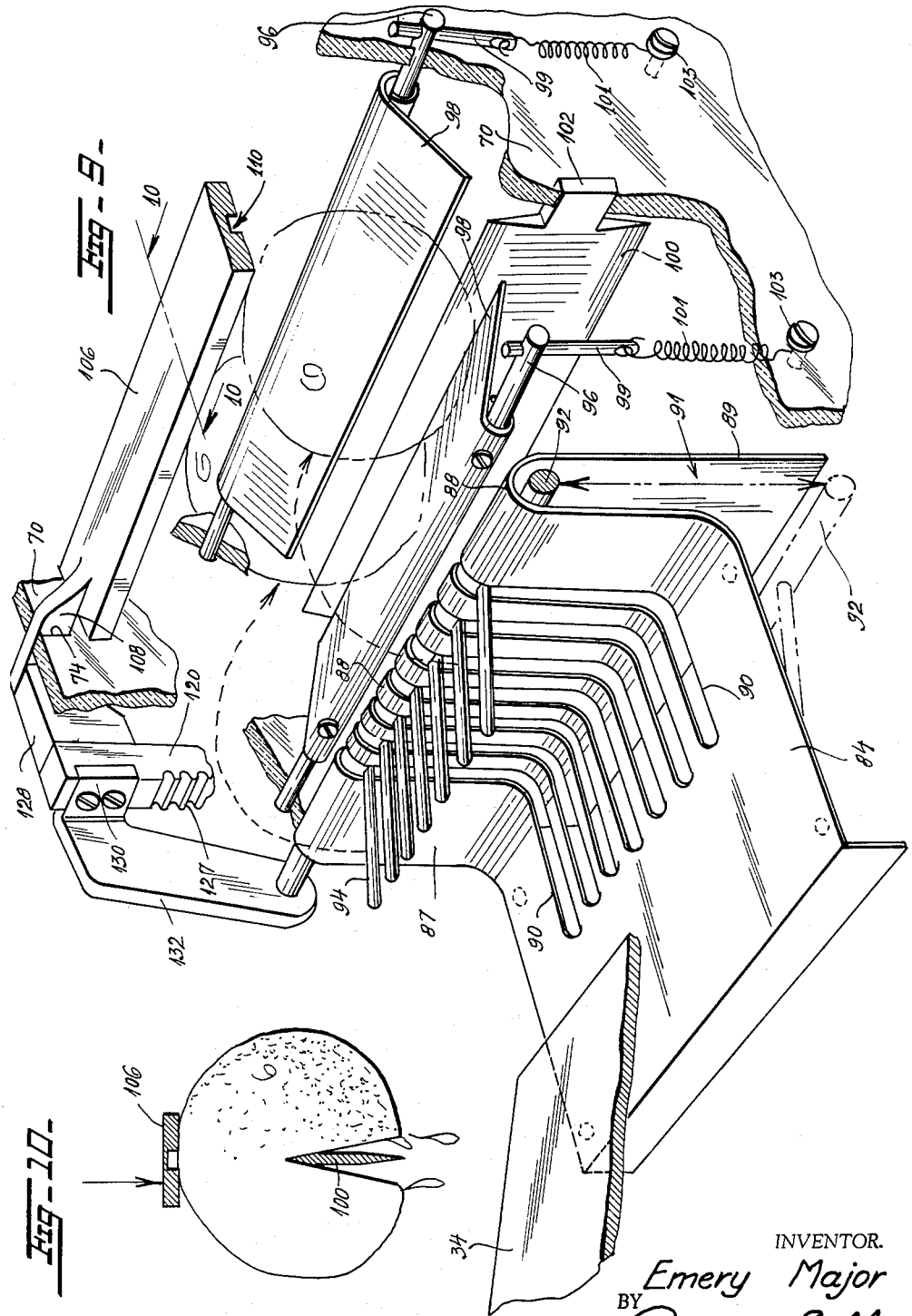

United States Patent Office 3,207,063
Patented Sept. 21, 1965

3,207,063
JUICE SQUEEZER
Emery Major, 416 E. 85th St., New York, N.Y.
Filed Apr. 14, 1964, Ser. No. 359,710
13 Claims. (Cl. 100—97)

This invention relates to machines for extracting juices from citrus fruits and the like, and more particularly to a machine for extracting juice from ripe oranges, lemons, grapefruit and the like.

The invention is particularly designed for use in homes, restaurants, hotels, hospitals, soda fountains, etc., for automatically cutting and squeezing citrus fruit, such as oranges, and delivering the juice thereof ready for use.

Broadly the invention comprises a machine into which citrus fruits such as oranges are fed, automatically cut into halves and the halves squeezed in such a manner as to effect a removal of the juice without damaging the skin or rind which contains an oil that if mixed with the juice imparts a disagreeable flavor thereto. The removed juice is caught and either bottled or canned or otherwise utilized. The machine is designed to perform all of the above operations automatically.

A principal object of the present invention is to provide a machine for extracting juices from citrus fruits wherein the fruit is caused to move progressively through an extraction zone throughout which the degree of compression of the fruit is progressively increased.

Another object of the invention is to provide a machine of this kind that is positive in operation, sanitary and highly efficient for the purposes intended.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a machine embodying the invention, the juice reservoir being shown partly extracted.

FIG. 2 is an enlarged vertical sectional view of the machine taken on the line 2—2 of FIG. 1, oranges being shown in various states of compression.

FIG. 3 is a similar view taken on the line 3—3 of FIG. 1 showing oranges being fed to the machine.

FIG. 4 is a similar view taken on the line 4—4 of FIG. 1.

FIG. 5 is a horizontal sectional view taken on the line 5—5 of FIG. 4 on an enlarged scale, parts being shown broken away.

FIG. 6 is an enlarged vertical sectional view taken on the line 6—6 of FIG. 3.

FIG. 7 is a perspective detail view of the finger actuating mechanism, with parts being broken away.

FIG. 8 is an enlarged vertical sectional view taken on the line 8—8 of FIG. 6.

FIG. 9 is a perspective view of the fruit positioning and cutting mechanism.

FIG. 10 is a cross-sectional view taken on the line 10—10 of FIG. 9 showing a step in the cutting of the fruit.

Referring now in detail to the various views of the drawings wherein similar reference numerals are used to indicate similar parts throughout, in FIG. 3 a machine for extracting juices from citrus fruit made in accordance with the invention is shown and designated generally at 10. The machine 10 is enclosed in a casing or housing 12 shown in FIG. 1 supported on feet 14. The casing 12 consists of side walls 16, 16, end walls 18 and 20, a bottom wall 22, and a top wall 24. A rectangular-shaped extension constituting a hopper 26 is formed on the top wall 24. The hopper 26 consists of side flanges 28, 28, end flanges 30 and 32 and a slanting bottom flange 34 extending beyond the end wall 18. The side, end and bottom flanges of the hopper define an open top for the hopper, communicating with an opening 36 in the top wall 24 of the casing therebelow.

The machine 10 per se is rectangular in plan and comprises a rectangular-shaped metal base 40 with upright front corner posts 42 and rear corner posts 44, the front posts being longer than the rear posts. A pair of upright side posts 46 are closely spaced from the front corner posts extending upwardly from the base and with the front corner posts support a narrow platform 48 at the front of the machine, for mounting a gear head electric motor 49.

The platform 46 and the rear corner posts 44 support a glass frame indicated generally at 50 for supporting the various mechanisms of the machine. The frame 50 consists of a front glass wall 52 supported on the rear edge of the platform 48, extending upwardly therefrom. A rear glass wall 54 is supported at its bottom end on a narrow rectangular vertically disposed metal plate 56 supported at its ends on the tops of the rear corner posts 44 that extend through openings in inwardly extending horizontally disposed flanges 58 at the ends of the metal plate 56. Nuts 60 on the top ends of the rear posts 44 fasten the plate 56 to the posts. The rear wall 54 extends above the front wall 52. Side glass walls 62 and 64 are secured at the rear edges thereof to the rear wall 54 by screws 66 and to the side end edges of the front glass wall 52 by screws 68. The side walls extend below the bottom end of the front wall to a point substantially level with the top of the rear posts 44. At the rear end of the frame, the side glass walls 62 and 64 are formed with upward extensions 70, 70, extending above the top end of the rear wall 54. Opposed slots 72, 72 are formed in the side walls 62 and 64 midway the ends thereof, and opposed slots 74, 74 are formed in the extensions 70, 70 of the side walls, the slots 74, 74 being narrower than the slots 72, 72, all of the slots intersecting the top ends of the side walls and extensions thereof. The slots 74, 74 constitute trackways. The extensions 70, 70 and rear wall 54 define an open top at the rear of the frame. The glass frame 50 is supported in elevated position above the base 40 a height substantially equal to the height of the rear posts 44 whereby a clearance 78 is provided below the frame to receive a slidable pan 80 having a knob or handle 82. A metal plate 84 closes the frame at the top front portion thereof, the plate being fastened in position by screws 86 extending into the top end edge of the side walls 62 and 64. Plate 84 is formed with an upward extension 87 continuing into a looped top end 88, which looped end continues downwardly in an extension 89 disposed perpendicular to the body of the plate 84 and protruding at its sides into the slots 72 in the side walls 62 and 64. The rear end of the body of the plate proper, the upward extension 87 and the looped top end 88 are formed with spaced elongated closed slots 90, intersecting the junctures of the rear end of the plate, the extension 87 and the looped top end 88. The extension 87, looped end 88 and downward extension 89 together with the edges of the slots 72 constitute a trackway 91. A shaft 92 normally extends through the trackway 91 and is normally positioned at the looped top end 88. A series of spaced fingers 94 are mounted on the shaft and extend radially of the shaft through the slots 90 forwardly of the frame.

A pair of shafts 96, 96 are pivotally mounted on the same horizontal plane as the plane of the looped top end 88 of the closure plate 84, between the extensions 70, 70 of the side walls 62 and 64, on both sides of the narrow slots 74 therein. Rectangular narrow metal plates 98, 98 are looped around the shaft along one long edge of the plates, the free long edges of the plates being in spaced relation on both sides of the slots 74, the plates being adapted to move up and down on both sides of the slots. The shafts 96, 96 protrude outwardly of the extensions 70, 70, the protruding ends being perforated to receive pins 99, which pins are pivotally connected to one end of coil springs 101, by end loops of the springs, the other end of the springs being fixed to screws 103 threaded into the side walls.

A cutter in the form of an elongated metal blade 100 disposed vertically with the cutting edge uppermost is supported on the base of the slots 74 by narrow lugs 102 formed on the ends of the blade and seated on the bases of said slots and extending outwardly of the extensions. The lugs may be secured in fixed position by adhesive or the like.

An elongated presser bar 106, rectangular in cross section, is movable up and down between the extensions 70, 70 of the side walls 62 and 64, the bar being guided in its movement by extensions 108, 108 protruding through the slots 74 in the extensions 70, 70. A groove 110 is formed in the lower surface of the bar for its length centrally thereof.

A series of elongated rubber rollers with shafts are journalled in the side walls 62, 64, consisting of spaced lower rollers 112 with shafts 113 closely spaced from each other, and similarly spaced upper rollers 114 with shafts 115. Seven of the lower rollers are shown, the front four rollers being disposed in alignment in a plane parallel to the plane of the base 40 and the remaining three rear rollers being disposed in a curved formation as shown in FIG. 2. Only four upper rollers 144 are shown, said four being disposed in vertical alignment with the front four rollers 112 of the lower series, with a space between the upper and lower rollers. The upper rollers, however, are disposed in a slightly curved formation so that the space between the upper and lower rollers gradually decreases from rear to front.

The mechanism for actuating the shaft 92 with fingers 94, the presser bar 106 and the rollers 112 and 114 will now be described. On one side of the side walls 62 and 64, rack bars 120 are vertically disposed and slidably mounted, the mounting including vertically disposed channel-shaped bearing members 122 secured to the outside of the side walls by screws 126, the bearing members opening forwardly of the frame, with the teeth 127 of the rack bars extending forwardly of the frame. At one end, the top end as viewed in FIG. 9, the smooth sides of the rack bars are welded to the protruding ends 108 of the presser bar 106 by means of blocks 128. The other side of the top of the rack bars is welded to an angular foot 130 formed on one end of an arm 132, the top end, the other ends or bottom ends of the arms being pivotally connected to the protruding ends of the shaft 92 carrying the fingers 94. A shaft 134 is journaled in the side walls 62 and 64 spaced laterally and forwardly of the channel bearing members 122 extending across the space between the side walls approximately midway the ends of the side walls and mounted on the outer protruding ends of the shaft 134 close to the side walls there are spur gears 136. The spur gears are in mesh with the teeth 127 of the rack bars 120.

Another shaft 138 is journalled in the side walls 62 and 64 of the frame at the front thereof. Shaft 138 protrudes outwardly of the side walls and on the end protruding outwardly of wall 62 one end of a crank 140 is pivotally connected. A substantially horizontally disposed rack bar 142 has one end pivotally connected to the other end of the crank. A triangular-shaped bearing member with a base 144 and spaced side walls 146 is fixedly mounted on the protruding end of shaft 134 outwardly of the spur gear 136 thereon. Rock bar 142 moves freely up and down and longitudinally through the bearing member constituted by base 144 and side walls 146. A pinion 148 is fixed on the portion of the shaft protruding through the apex end of the bearing member and the rack bar 142 slidably extends through the bearing member underneath the pinion with the teeth 149 of the rack bar uppermost in mesh with the teeth of the pinion.

On the end of shaft 138 protruding outwardly of side wall 64 a sprocket wheel 150 is fixed and outwardly of the sprocket wheel 150 another sprocket wheel 152 is fixed on the shaft. A sprocket wheel 154 is fixed on the protruding end of the motor shaft 156 and trained around the sprocket wheel 154 and outer sprocket wheel 152 on shaft 138 there is a continuous chain 158. On the outer protruding ends of the shafts 113 and 115 of the rollers 112 and 114, respectively, that protrude through the side wall 64, there are sprocket wheels 170 disposed in the same vertical plane, and in the same vertical plane with the inner sprocket wheel 150 on shaft 138. An endless or continuous chain 172 is trained around the sprocket wheels 170 and sprocket wheel 150. The motor 49 is electrically connected to a source of E.M.F. by means of conductors 176.

In FIGS. 6 and 7, a coil spring 93 is shown encircling shaft 92 with one end secured to the shaft by a screw 95 and its other end hooked over a pin 97 extending laterally from the arm 132 and secured thereto by a nut 101. The pin 97 is urged into engagement with a pin 103 radiating from the adjacent end of shaft 92 allowing the fingers to move back against an orange in their lower positions.

In operation, fruit in the form of oranges or the like is fed through the trough 26 at the top of the casing 12. The oranges fall on the closure plate 84 at the front of the frame and are lifted up by the fingers 94 on shaft 92 and dumped rearwardly onto the swinging plates 98 over the cutter 100 and under the presser bar 106. When the motor 49 is activated, the drive chains 158 and 172 rotate the drive shaft 138 and rollers 112 and 114. Shaft 138 swings crank 140 which in turn will slide rack bar 142 across the pinion 148 which turns shaft 134, turning spur gear 136 which moves rack bar 120 up and down. Rack bar 120 carries arms 132 along moving the shaft 92 with fingers 94 and at the same time carries the presser bar 106 up and down. The downward movement of the presser bar presses the positioned orange down against the swingable plates 98 forcing said plates downwardly against the action of the springs 101 thereby opening said plates permitting the orange to be pressed against the cutter. Continued downward movement of the presser bar cuts the orange into two halves, which halves fall by gravity on the wide opening at the rear therebetween the rollers to the upper rollers 114 turning in a counter-clockwise direction as viewed in FIG. 3, that is, in the direction of the front of the machine, and the lower rollers turning in a clockwise direction to force the orange halves forwardly, compressing the halves progressively in the space between the rollers thereby pressing all of the juice out of the orange, the extracted juice falling by gravity into the pan or tank 80 below. The exhausted rind and pulp of the orange are carried over a plate 180 having a curved lip 182, disposed across the frame in front of the front lower roller 112 and deposited in a receiver 184 having a handle 186, whence they may be conveyed to another machine for further processing into by-products.

It will be apparent from the foregoing that the juice extracting machine operates automatically to feed the fruit through the machine whereby the juice is extracted.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A machine for extracting juice from citrus fruits and the like, comprising a frame constituted by front, rear and side walls, the side walls having upright extensions, said extensions and rear wall defining an open top for the frame, a fixed cutter between the extensions at the bottom thereof, means for supporting fruit above the cutter in line therewith, means for moving the supported fruit against the cutter for cutting said fruit into halves, a series of rollers below the cutter extending transversely of the frame, said rollers being arranged in pairs of twos vertically disposed in alignment, the horizontal spacing between the top rollers and the bottom rollers decreasing progressively from the rear to the front of the frame, and means for rotating said rollers simultaneously with the movement of the means for moving the supported fruit.

2. A machine for extracting juice from citrus fruits and the like, comprising a frame constituted by front, rear and side walls, the side walls having upright extensions, said extensions and rear wall defining an open top for the frame, a fixed cutter between the extensions at the bottom thereof, pivoted plates supported between the extensions above the cutter for supporting fruit above the cutter in line therewith, means for moving the supported fruit against the cutter for cutting said fruit into halves, a series of rollers below the cutter extending transversely of the frame, said rollers being arranged in pairs of twos vertically disposed in alignment, the horizontal spacing between the top rollers and the bottom rollers decreasing progressively from the rear to the front of the frame, and means for rotating said rollers simultaneously with the movement of the means for moving the supported fruit.

3. A machine for extracting juice from citrus fruits and the like, comprising a frame constituted by front, rear and side walls, the side walls having upright extensions, said extensions and rear wall defining an open top for the frame, a fixed cutter between the extensions at the bottom thereof, means for supporting fruit above the cutter in line therewith, a vertical movable presser bar above the fruit for moving the fruit against the cutter for cutting the fruit into halves, means for moving said presser bar, a series of rollers below the cutter extending transversely of the frame, said rollers being arranged in pairs of twos vertically disposed in alignment, the horizontal spacing between the top rollers and the bottom rollers decreasing progressively from the rear to the front of the frame, and means for rotating said rollers simultaneously within the movement of the presser bar.

4. A machine for extracting juice from citrus fruits and the like, comprising a frame constituted by front, rear and side walls, the side walls having upright extensions, said extensions and rear wall defining an open top for the frame, a fixed cutter between the extensions at the bottom thereof, pivoted plates supported between the extensions above the cutter for supporting fruit above the cutter in line therewith, a vertical movable presser bar above the fruit for moving the fruit against the cutter for cutting the fruit into halves, means for moving said presser bar, a series of rollers below the cutter extending transversely of the frame, said rollers being arranged in pairs of twos vertically disposed in alignment, the horizontal spacing between the top rollers and the bottom rollers decreasing progressively from the rear to the front of the frame, and means for rotating said rollers simultaneously with the movement of the presser bar.

5. A machine for extracting juice from citrus fruits and the like as defined in claim 4, characterized by a removable tank with an open top underneath the rollers for receiving the extracted juice.

6. A machine for extracting juice from citrus fruits and the like as defined in claim 4, characterized by a removable receiver at the front of and below the frame for receiving the exhausted rinds of the fruit.

7. A machine for extracting juice from citrus fruits and the like as defined in claim 4, characterized by a removable tank with an open top underneath the rollers for receiving the extracted juice and by a removable receiver at the front of and below the frame for receiving the exhausted rinds of the fruit.

8. A machine for extracting juice from citrus fruits and the like as defined in claim 4, characterized by a removable receiver at the front of and below the frame for receiving the exhausted rinds of the fruit, and a transverse plate with a curved lip below the front wall for guiding the exhausted rinds into the receiver.

9. A machine as defined in claim 4, wherein the means for moving the presser bar includes an electric motor, a rotatable shaft operatively connected to the motor shaft, a crank pivotally connected at one end to one end of the rotatable shaft, a horizontally disposed rack bar pivotally connected to one end of the crank, a vertically movable rack bar operatively connected to the horizontally disposed rack bar, means of rigid connection between one end of the vertically movable rack bar and the presser bar whereby movement of the latter rack bar is transmitted to the presser bar.

10. A machine as defined in claim 9, wherein the operative connection between the horizontally and vertically movable rack bars includes a shaft journalled in the side walls of the frame, a pinion fixed on the outer end of said last-named shaft meshing with the teeth of the horizontally disposed rack bar, and a spur gear fixed on the end of said last-named shaft inwardly of the pinion, said spur gear meshing with the teeth of the vertically movable rack bar.

11. A machine as defined in claim 10, characterized by means for moving the inserted fruit to position on the pivoted plates above the cutter, said positioning means including a fruit supporting plate having an upward integral extension at one end, said extension terminating in an upper looped end, said looped end continuing downwardly parallel to the extension in spaced relation, said extension, looped end and parallel downward extension defining a trackway, the body of the plate, the extension and the looped end having spaced elongated slots therein, a vertically movable shaft extending through the trackway with its ends protruding outwardly thereof, a rigid arm connecting the protruding end of the movable shaft and the end of the vertically movable rack bar whereby vertical movement of the latter rack bar is transmitted to the movable shaft, and fingers fixed on the movable shaft radiating therefrom and carried thereby, the slots in the fruit supporting plate being in the path of movement of the fingers whereby the fingers are adapted to engage the fruit and lift the fruit upwardly and deposit the fruit onto the pivoted plates above the cutter.

12. In a machine of the kind described, mechanism for cutting fruit in half, said mechanism including a vertically disposed cutter blade, movable fruit supporting plates above the cutter blade, a presser bar above the movable plates in line with the cutter blade and mechanism for actuating said presser bar, said mechanism including an electric motor, a horizontally movable rack bar operatively connected to the motor, a vertically movable rack bar operatively connected to the horizontally movable rack bar, and means of rigid connection between the top end of the vertically movable rack bar and the presser bar.

13. In a machine of the kind described, mechanism for positioning fruit in line with a cutter and for cutting the aligned fruit in half, said mechanism including a fixed plate for supporting fruit inserted into the machine, said plate terminating at one end in an upright extension, said extension terminating at its top end in a looped portion, said looped portion continuing downward into an extension, said upright extension, looped portion and downward extension defining a trackway, said one end of the plate, said upright extension and said looped portion having elongated slots therein, a shaft extending through the trackway with its ends protruding outwardly thereof, fingers radiating from the shaft through the slots, the slots being in the path of movement of the fingers, a vertically movable rack bar, an arm rigidly connecting the end of the rack bar and the protruding end of the shaft, an electric motor, means of operative connection between the motor shaft and the vertically movable rack bar, and a presser bar fastened to the top end of the vertically movable rack bar, the cutter being in the path of movement of said presser bar.

References Cited by the Examiner

UNITED STATES PATENTS

| | | | |
|---|---|---|---|
| 2,067,555 | 1/37 | Walker | 100—98 |
| 2,479,194 | 8/49 | Eastman | 100—97 |
| 2,515,749 | 7/50 | Wallace et al. | 100—97 |
| 2,552,171 | 5/51 | Hagerty | 100—97 |
| 2,667,118 | 1/54 | Nelson | 100—97 |
| 2,713,434 | 7/55 | Belk | 100—215 X |
| 2,748,693 | 6/56 | Drain et al. | 100—215 X |
| 2,975,810 | 3/61 | Wurgaft | 146—72 X |

WALTER A. SCHEEL, *Primary Examiner.*